Jan. 29, 1957 C. A. KNAPP 2,779,471
METHOD OF HANDLING SLUDGE IN LONGITUDINAL SETTLING TANKS
Filed Oct. 13, 1954 3 Sheets-Sheet 1

INVENTOR
CHARLES A. KNAPP,
BY William Fox
ATTORNEY

Jan. 29, 1957  C. A. KNAPP  2,779,471
METHOD OF HANDLING SLUDGE IN LONGITUDINAL SETTLING TANKS
Filed Oct. 13, 1954  3 Sheets-Sheet 3

INVENTOR
CHARLES A. KNAPP,
BY William J. Fox
ATTORNEY

2,779,471

METHOD OF HANDLING SLUDGE IN LONGITUDINAL SETTLING TANKS

Charles A. Knapp, Glenbrook, Conn., assignor to Dorr-Oliver Incorporated, a corporation of Delaware Application October 13, 1954, Serial No. 462,081

1 Claim. (Cl. 210—55)

This invention relates to sedimentation tanks of the longitudinal type in which a solids carrying liquid or solids suspension enters the tank at one end, while clarified liquid overflows at the opposite end, and sediment or sludge is conveyed mechanically over the tank bottom to a point of withdrawal.

More specifically, this invention relates to sedimentation tanks employing sediment raking means for conveying the sludge in compound fashion, that is in a combined longitudinal as well as transverse direction towards a relatively restricted outlet zone. Hence, the raking mechanism here considered is in distinction from those which convey the sediment or sludge to a transverse collecting zone which in turn may require cross-collecting means for conveying the sludge to the outlet proper.

The raking mechanism herein contemplated is known to be of the kind whereby the sludge is conveyed from each end of the tank as well as from all points of the tank bottom in compound fashion to an outlet point intermediate the ends of the tank, as the mechanism travels back and forth between the ends of the tank. Such reciprocating mechanism comprises two sets of raking blades arranged in opposition to each other, which sets become effective alternatingly each time the mechanism reverses its direction of travel at the respective ends of the tank, each set of blades to convey sludge from the respective end of the tank towards the intermediate sludge outlet. That is to say, at each reversal of the travelling mechanism the one set of blades, which is the then nearest to the end wall of the tank, is lowered from inactive position to active sludge engaging position, while conversely the opposed set of blades is raised from active sludge engaging position to inactive position. Each set of blades comprises blade elements which impart to the sludge longitudinal as well as lateral component movements towards the point of outlet, as a result of the reciprocating movement of the mechanism.

A practical example of such a mechanism comprises a carriage spanning the width of the tank and operating on tracks provided at the top of the side walls of the tank, the raking means proper being supported underneath the carriage frame by means of bracket structure extending from the carriage downwardly into the tank. The raking means they may comprise a substantially horizontal but tiltable raking frame pivotally mounted upon the lower end of the depending bracket structure, with one set of the aforementioned blade elements being mounted upon each respective free end portion of this raking frame. That is to say, the carriage is activated to travel back and forth between the ends of the tank, while the actuating and positioning of the raking frame is coordinated and timed with respect to the carriage travel in such a manner that at each reversal of the direction of the carriage movement at the respective end of the tank, the raking frame is tilted into the appropriate position. Thus, in the operating cycle of this mechanism, the carriage reaches one end of the tank with the raking frame so tilted that the then outwardly pointing end thereof with its set of blades is raised to inactive position, while the opposite inwardly pointing end of the frame with its set of blades is tilted downwardly in active sludge engaging position. Before the carriage reverses its direction of travel to start on its return trip towards the opposite end of the tank, the raking frame is tilted so that the then outwardly pointing end with its set of blades (that is those then nearest to the end of the tank) is lowered to active sludge engaging position, while by the same token the opposite set of blades is raised to inactive position. In the thus tilted position the raking frame subsequently reaches the opposite end of the tank where the reversal of the carriage movement and a corresponding tilting of the raking frame again takes place.

As a result of this operating cycle, sludge is eventually conveyed from all points of the tank bottom and collected and delivered to the point of the sludge outlet. However, to some extent, the effectiveness of such operation with respect to sludge movement, collection, and withdrawal is dependent upon the sludge load to be handled, that is upon the character of the sludge itself as well as the quantities that are being deposited from the solids carrying liquid passing through the tank. Such mechanisms have worked well with such deposits under such loads as were experienced where the tank was used for highly dilute suspensions, as in the removal of the kind of deposits or precipitates encountered in the case of water treatment. Yet when applied to other kinds of operation, such, for example, as may be encountered in the clarification of raw sewage sludge delivered at the outlet or in the outlet zone, there may occur at the sludge outlet and in the absence of special cross-collecting means, a sludge accumulation large enough to cause the mechanism to become overloaded and eventually to stall.

The means for actuating the carriage may be in the form of parallel rope drive such as indicated in the patent to Charles H. Scott, No. 2,670,080, issued February 23, 1954, for a sediment raking mechanism for longitudinal settling tanks, or they may be in the form of a parallel rope drive in sediment raking drives for longitudinal rectangular settling tanks, as shown in the copending patent application of Charles H. Scott, Serial No. 316,360, filed October 23, 1952, now patent No. 2,692,680. This rope drive mechanism has a drive motor disposed at one end of the tank which is herein termed the near end of the tank, while the opposite end of the tank is herein termed the far end of the tank. Consequently, the direction of travel of the carriage towards the near end of the tank will be the inward travel direction as distinct from the outward travel direction towards the far end of the tank.

It is an object of this invention to guard against and avoid the above mentioned stalling of the mechanism by providing a method and means whereby the mechanism will rid itself of congestion or excess of accumulation of sludge in the sludge outlet zone without the use of special cross-collecting means, before a new load of sludge is delivered to that zone by way of another reciprocation of the mechanism. This object is attained by providing control means whereby the reciprocatory mechanism is put through at least one short-stroke operating cycle or reciprocation about the sludge outlet zone before being allowed to resume its normal full stroke travel or reciprocations from end to end of the tank. In this way, the raking mechanism may pass over the sludge outlet zone a number of times, instead of only once per full stroke cycle, with the tilting of the raking frame controlled accordingly, until the sludge accumulation is cleared. Thus, sludge accumulation is avoided by interposing between full stroke operating cycles a period of short stroke operation conducted within a limited transverse area of the tank surrounding the sludge outlet zone, in that sludge accumulation is cleared away and disposed of through the outlet before another sludge load is permitted to arrive at the outlet zone.

In one embodiment, the normal full stroke operating cycles of the reciprocating carriage and its raking blade structure is controlled by motor-driven reversible rope drive mechanism in such a manner that one or more short stroke operating cycles or reciprocations are interposed between any two long stroke reciprocations of the carriage.

One feature, therefore, provides motor reversing means whereby the carriage is stopped after only partial completion of an outward stroke, and returned from an intermediate point of travel or from what is herein termed the short stroke limit point, with attendent reverse positioning at that time of the raking blade structure. In this way, the raking means operate or shuttle temporarily over a limited area of the tank bottom surrounding the sludge outlet proper, namely in such a way as to convey any accumulation of sludge to and into the sludge outlet itself from all sides thereof.

In summary, this invention provides a method for operating flat-bottomed longitudinal settling tanks equipped with raking means of the double-acting type which normally travel back and forth full stroke between the ends of the tank, and which travelling raking means comprises opposed sets of inclined raking blade means for conveying the sludge over the tank bottom to a restricted outlet means therein. This method provides that at least one full-stroke reciprocation of the raking means alternate with at least one short-stroke reciprocation. The short-stroke reciprocation is controlled to cover a relatively limited sludge outlet means or opening proper, and in effect constituting a transverse sludge collecting zone. A full-stroke reciprocation conveys and delivers sludge from the ends of the tank to and into the short-stroke area, when the short-stroke reciprocation takes over to provide what in effect is transverse transportation of the sludge within the short-stroke area towards and into the restricted sludge outlet means proper. This operating method thus provides that sludge accumulation upon and within the short-stroke area is removed into the outlet prior to the arrival at the short-stroke area of additional sludge conveyed by subsequent full-stroke reciprocation of the raking means.

As this invention may be embodied in several forms without departing from the spirit or essential characteristics thereof, the present embodiment is therefore illustrative and not restrictive, since the scope of the invention is defined by the appended claim rather than by the description preceding it, and all changes that fall within the metes and bounds of the claim, or of forms that are their functional as well as conjointly cooperative equivalents, are therefore intended to be embraced by the claim.

Figure 1:
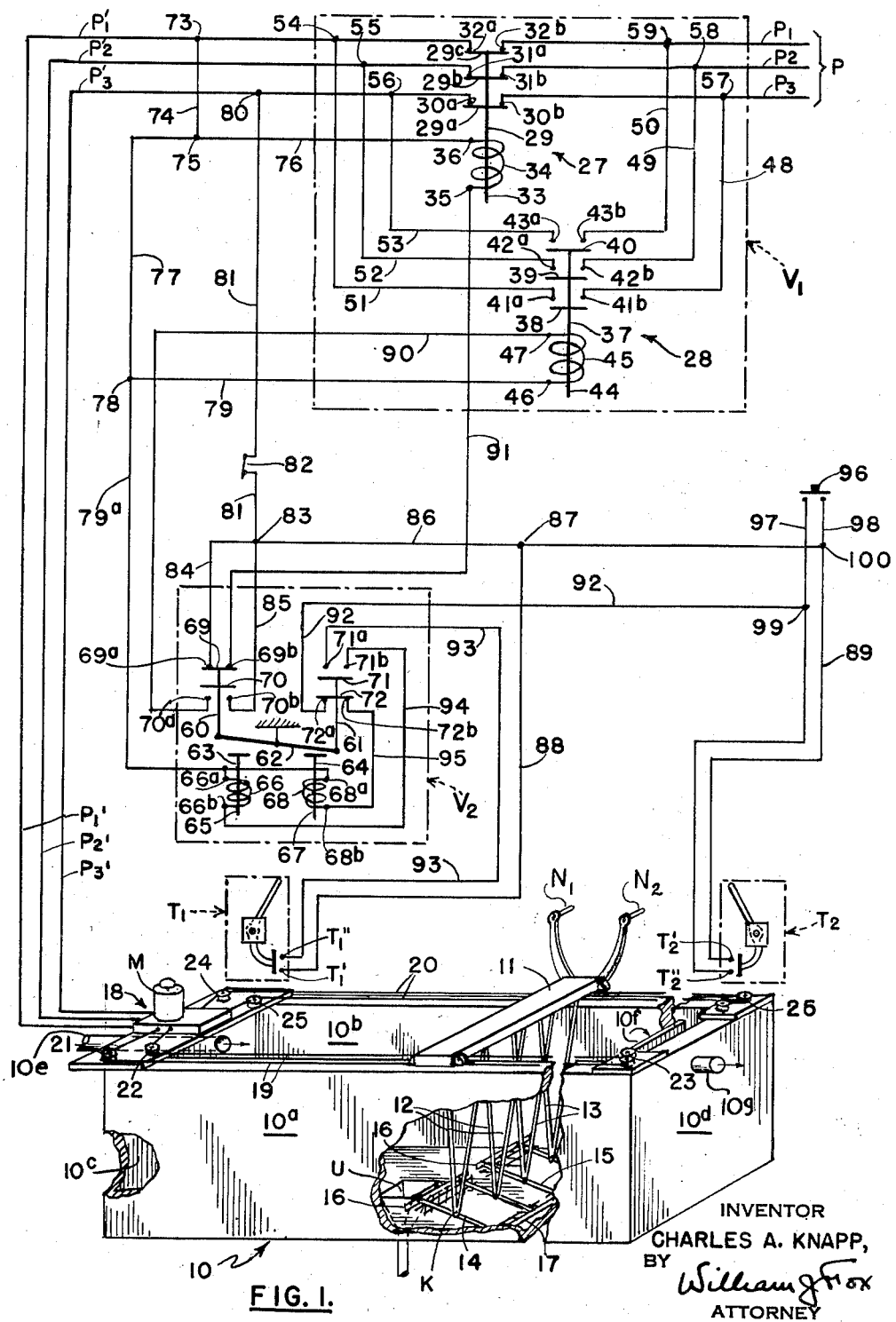
Figure 1 is a diagrammatic perspective view of the settling tank provided with motorized rope drive mechanism for reciprocating the carriage-supported raking means, with a wiring diagram for effecting automatic reciprocation of the carriage here being shown conditioned to move the carriage in the direction from the near end to the far end of the tank.

The settling tank and its sediment raking equipment as shown in the diagrammatic perspective of Figure 1 comprises a tank 10 proper having a pair of sidewalls $10^a$ and $10^b$, and end wall $10^c$ representing the near end of the tank, and an end wall $10^d$ representing the far end of the tank. An influent connection $10^e$ is shown provided in the end wall $10^c$, and a transverse effluent launder $10^f$ together with an effluent connection $10^g$ is associated with the opposite end wall $10^d$. The raking equipment comprises a carriage 11 spanning the width of the tank to operate on rails here not visible provided atop and along the sidewalls $10^a$ and $10^b$ of the tank. Two pairs of bracket structures 12 and 13 extend from the carriage downwardly into the tank, each of said pairs of bracket structures supporting at its lower end a tiltable raking frame 14 and 15 respectively. Each of the raking frames 14 and 15 has at each end thereof a set of plow-like raking blades 16 and 17. The raking frames 14 and 15 are tiltable in unison about the transverse horizontal axis "K" so that the raking blades at one end of the frame are active with respect to the tank bottom when the carriage moves in one direction, while the raking blades at the other end of the raking frame are active with respect to the tank bottom when the carriage moves in the opposite direction. That is to say, the tilting of the raking frames 14 and 15 is effected automatically each time that the direction of travel of the carriage is reversed at the respective end of the tank. As the net result of such a reciprocation of the carriage between the ends of the tank, the sediment or sludge is raked from all points of the tank bottom stagewise towards and into a relatively restricted outlet U shown also in the diagrammatic plan view of Figure 3. This sludge outlet U (see Fig. 3) is located a relatively short distance $d_1$ from the near end $10^c$ of the tank, the area of this outlet with respect to the tank bottom being defined by the sides $a$ and $b$, as well as by the distances $c$ and $d$ from the side walls of the tank.

The carriage 11 is moved back and forth between the ends of the tank by means of a reversible parallel rope drive mechanism which may be similar in construction and in operation to that shown in the aforementioned patent to Charles H. Scott, U. S. 2,670,080, issued February 23, 1954, which rope drive mechanism has the dual function of moving the carriage back and forth between the ends of the tank as well as of tilting the raking frames 14 and 15 in timed relationship with respect to the points of reversal of the carriage at the respective ends of the tank. That is to say, each time that the pull of the drive rope is reversed at the end of the carriage movement, that pull will effect the tilting of the raking frames before becoming effective to initiate the movement of the carriage proper away from the respective end of the tank. The rope drive is here indicated by a motorized drive unit 18 mounted at and upon the near end of the tank, and a drive rope comprising a loop portion 19 associated with one side of the carriage and another loop portion 20 associated with the opposite side of the carriage. The course of the one loop portion 19 is defined at the near end thereof by a pair of pulleys 21 and 22 and at the far end thereof by a pulley 23; the course of the other loop portion 20 is defined at the near end thereof by a pair of pulleys 24 and 25 and at the far end thereof by a pulley 26.

According to this invention, this rope drive is actuated or controlled in a manner whereby the carriage 11 is moved through an alternation of long and short travelling cycles, a long travelling cycle here being understood as comprising the movement of the carriage from the near end to the far end of the tank and again back to the near end of the tank, the short travelling cycle here being understood to comprise the movement of the carriage from the near end of the tank to a point past the sludge discharge to an intermediate position not far beyond the sludge outlet and again back to the near end of the tank.

A long stroke cycle brings a load of sludge from the far end to the near end of the tank, and thus to a limited area at the near end which area comprises the sludge outlet area itself as well as the immediate environment thereof between it and the sidewalls at the near end of the tank. A subsequent short stroke cycle or a plurality of such cycles of carriage movement operating within that limited area will convey the sludge therein to and into the outlet proper, and will thus dispose of or preclude any objectionable sludge accumulations or bottle neck formations in the course of sludge movements in and from the tank.

That is to say, the long stroke conveyance of the sludge load to the limited area surrounding the sludge outlet proper is followed by one or more short stroke reciprocations of the carriage within this limited area, with the result that any sludge accumulation in that area at the near end of the tank is disposed of through the outlet U proper before a new sludge load is allowed to arrive in that area from another long stroke travelling cycle of the raking mechanism.

Figure 3:
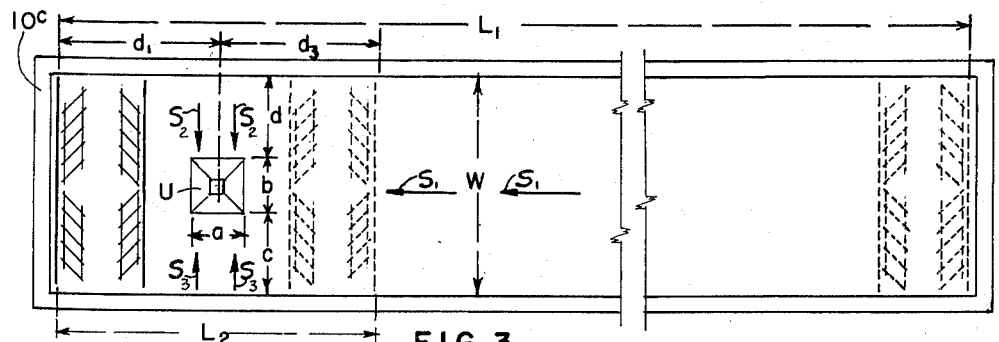
Figure 3 is a diagrammatic plan view of the tank with positions of the carriage and raking means shown to indicate alternating long stroke and short stroke reciprocations of the carriage.
Figure 4:
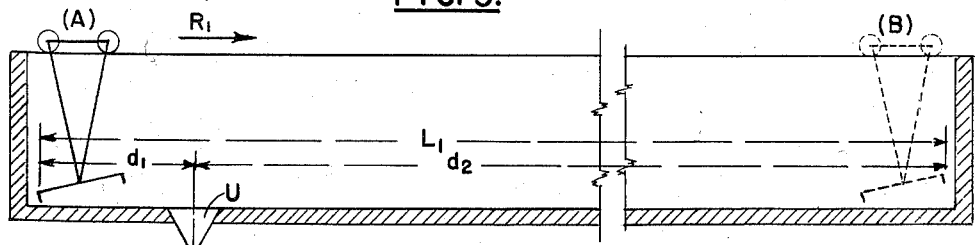
Figures 4 and 5 are diagrammatic longitudinal sectional views of the tank with the position of the carriage indicated in accordance with the long stroke reciprocation thereof.
Figure 5:
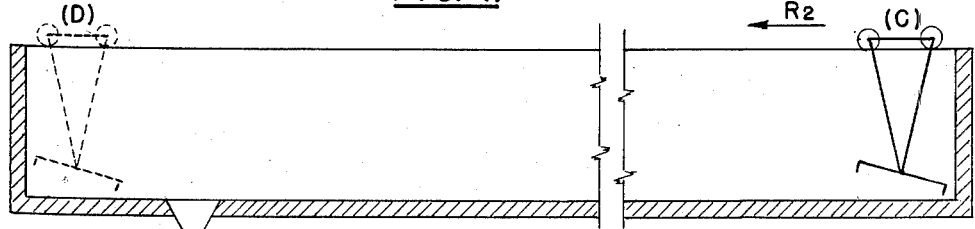
Figure 6:
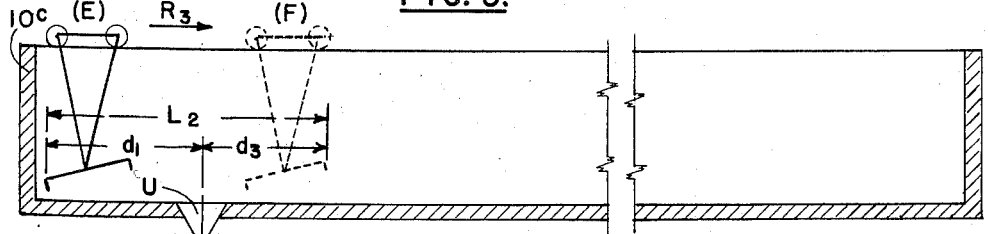
Figures 6 and 7 are diagrammatic longitudinal sectional views of the tank with positions of the carriage shown to indicate the short stroke operation thereof.
Figure 7:
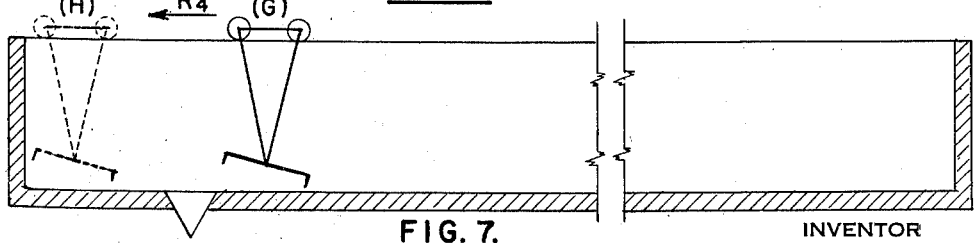

Referring to Figures 3, 4, 5, a long stroke travelling cycle of the carriage starts with the carriage and the raking means tilted as shown in the starting position (A) thereof. From there the rope drive is effective to move the carriage in the direction of arrow $R_1$, along a distance $d_1$ to the outlet U to continue through the distance $d_2$ to the far end of the tank, its end position there being indicated by position (B), the total length of the long stroke travelling cycle of the carriage being designated as $L_1$ (see Fig. 3). When the carriage reaches the far end position (B) of Fig. 4, the rope drive is reversed, so that the pull of the rope then first tilts the raking frame from the (B) position to that shown in position (C) in Figure 5 at the far end of the tank, the continued pull of the rope drive then being effective to return the carriage in the direction of arrow $R_2$ to the tank, its end position there being designated as (D). There again the drive means are reversed so that a subsequent initial pull of the drive rope in the direction of arrow $R_3$ will first tilt the raking frames to their operating position (E) in Figure 6, continued pull of the drive rope then being effective to initiate the short stroke cycle that will move the carriage towards and past the outlet U to stop it at an intermediate point indicated by position (F) here shown to be a distance $d_3$ past the outlet U, this distance $d_3$ here shown to be about equal to the distance $d_1$ between the outlet and the near end of the tank. The sum total of the distances $d_1$ plus $d_3$ defines the total length $L_2$ (see Fig. 6) of the short travel of the carriage. That is to say, upon the carriage reaching the position (F) the rope drive is again reversed here, prematurely, so to speak, whereby the then initial pull of the drive rope in the direction of arrow $R_4$ again becomes effective first to position the raking frame by tilting to position (G) of Figure 7, while continued pull in the direction of arrow $R_4$ will return the carriage to the near end of the tank, that is to the end point of the short stroke cycle operation of the carriage, as represented by position (H). This short cycle operation thus covers a limited area surrounding the sludge outlet, which area is defined by the short stroke travel distance $L_2$ and by the width W of the tank, which short stroke cycle may be repeated any number of times desired to dispose of any sludge load in this area surrounding the sludge outlet proper, before resuming the long stroke cycle operation.

The embodiment of the invention herein shown provides control means for alternatively effecting the reversal of the rope drive means and thereby the reversal of the direction of carriage travel, at the respective ends of the tank. Such control means are here represented by a wiring diagram for reversing the rope drive motor as the carriage actuates respective limit switches provided at the respective ends of the tank, where the reversal of the rope drive mechanism also effects the proper positioning or tilting of the raking frames. Additional switch means are provided in conjunction with this wiring diagram and more particularly in conjunction with the limit switches, whereby travel of the carriage away from the near end of the rank may be stopped at an intermediate point a relatively short distance past the sludge outlet, there to be reversed along with a reversal of the tilted position of the raking frames, in order that there may be established and realized the short stroke operating cycle of the carriage. That is to say, after the drive motor has been reversed at the completion of a long stroke travelling cycle, and the carriage is again on its way out towards the far end of the tank, its travel may be stopped and reversed at the desired intermediate point of travel corresponding to position (F), for example by means of a manually operated switch connected across and thus substituting for the far end limit switch of the system. In this way, the carriage is stopped prematurely at this intermediate point of travel, and with the raking frames properly tilted is returned to its initial position at the near end of the tank.

Figure 2:
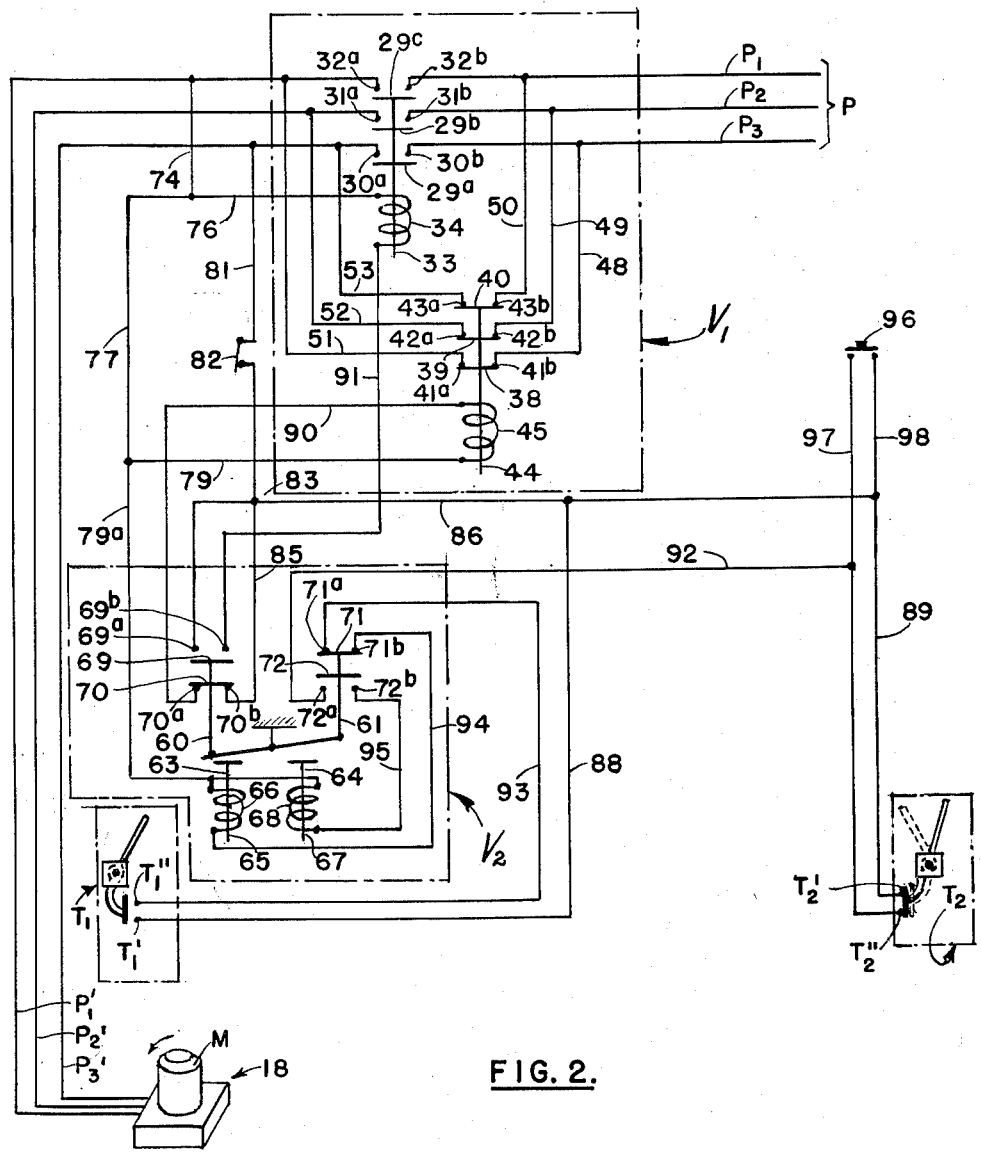
Figure 2 shows the wiring diagram conditioned to move the carriage in the opposite direction, namely from the far end to the near end of the tank.

There may now be described in detail the operation of the electrical wiring diagram of Figures 1 and 2 whereby the respective long stroke and short stroke operating cycles of the carriage and of the raking mechanism can be established for the purpose of this invention.

The electrical system comprises a drive motor M with a drive unit 18 having a three-phase power supply P comprising the three phases $P_1$, $P_2$, $P_3$, a main reversing relay switch unit $V_1$ for three phase power supply, a reversing relay switch unit $V_2$ of the mechanically interlocking type for controlling the reversal of the main reversing switch unit $V_1$, and a pair of limit switches $T_1$ and $T_2$ disposed at the near end and at the far end respectively of the tank, which limit switches are to be actuated by the carriage 11 to initiate the reversal of the drive motor M at the respective ends of full stroke travel of the carriage from end to end of the tank. This is indicated by actuator members $N_1$ and $N_2$ provided upon the carriage for actuating the limit switches $T_1$ and $T_2$ respectively.

The main switch unit $V_1$ comprises a pair of solenoid controlled switches 27 and 28 connected in parallel, and to be closed and opened in alternation for reversing the three-phase power supply to the drive motor M. The switch 27 comprises a solenoid controlled switch member 29 having three contact portions $29^a$, $29^b$, $29^c$, associated with corresponding pairs of contact terminals, namely one pair $30^a$ and $30^b$, a second pair $31^a$ and $31^b$, and a third pair $32^a$ and $32^b$. The switch member 29 has an armature 33 surrounded by a solenoid 34 having terminals 35 and 36. The switch 28 comprises a switch member 37 having three contact portions 38, 39, 40 associated with three corresponding pairs of contact terminals, namely, a first pair $41^a$ and $41^b$, a second pair $42^a$ and $42^b$, and a third pair $43^a$ and $43^b$. The switch member 37 has an armature 44 surrounded by a solenoid 45 having terminals 46 and 47.

The contact terminals of the two switches 27 and 28 contained in the main switch unit $V_1$ are interconnected as follows: Terminals $41^b$, $42^b$, $43^b$ on switch 28 are interconnected with terminals $30^b$, $31^b$, $32^b$ respectively of switch 27, whereas the terminals $41^a$, $42^a$, $43^a$ of switch 28 are interconnected with terminals $32^a$, $31^a$, $30^a$ respectively of switch 27. Thus terminal $41^b$ has an interconnecting conductor 48 leading to terminal $30^b$, terminal $42^b$ has an interconnecting conductor 49 leading to terminal $31^b$, and terminal $43^b$ has an interconnecting conductor 50 leading to terminal $32^b$. Correspondingly, terminal $41^a$ has an interconnecting conductor 51 leading to terminal $32^a$, terminal $42^a$ has an interconnecting conductor 52 leading to terminal $31^a$, while terminal $43^a$ has an interconnecting conductor 53 leading to terminal $30^a$. The interconnecting conductors 51, 52, 53, have junction points 54, 55, 56 respectively with the incoming three power phases $P_1$, $P_2$, $P_3$, while the interconnecting conductors 48, 49, 50, have junction points 57, 58, 59 with outgoing power phases $P_1'$, $P_2'$, $P_3'$.

The reversing relay switch V₂ with mechanical interlock is here diagrammatically presented as comprising a pair of switch or contact members 60 and 61 which are mechanically interlocked as indicated by an interlocking member 62. This interlocking relay switch V₂ further comprises a pair of solenoid-controlled tappet members 63 and 64 which are co-actively so associated with the interlocking member 62 that momentary energization alternatingly of the one and of the other tappet solenoid will move and position the interlocking member 62 according thereby each time reversing the position of the respective interlocking switch members 60 and 61. Hence the one tappet member 63 has an armature 65 surrounded by a solenoid 66 having terminals 66ª and 66ᵇ, while the other tappet member 64 has an armature 67 surrounded by a solenoid 68 having terminals 68ª and 68ᵇ.

The switch member 60 has a pair of contact portions 69 and 70, the contact portion 69 having a pair of associated contact terminals 69ª and 69ᵇ, the contact portion 70 having an associated pair of contact terminals 70ª and 70ᵇ, the relationship between the contact portions 69 and 70 and their respective pairs of contact terminals being such that the one pair of terminals are closed by its contact portion while the other pair of terminals are opening and vice versa. Similarly, the switch member 61 has a pair of contact portions 71 and 72, the contact portions having an associated pair of contact terminals 71ª and 71ᵇ, the contact 72 having an associated pair of terminals 72ª and 72ᵇ, the relationship between contact portions 71 and 72 and their respective pairs of contact terminals being such that when one pair of terminals is closed by its contact portion, the other pair of contact members are opening and vice versa.

The various switch units and limit switches (V₁, V₂, T₁, T₂), are electrically connected with respect to one another in the following manner: From point 73 on power phase P₁ a conductor 74 leads to primary branch point 75 whence one branch conductor 76 leads to terminal 36 of solenoid 34, while another conductor 77 leads to a secondary branch point 78. From secondary branch point 78, a branch conductor 79 leads to terminal 46, while another branch conductor 79ª leads to terminals 66ª and 68ª of solenoids 66 and 68 respectively. From point 80 on power phase P₃ a conductor 81 leads by way of plain switch 82 to a primary branch point 83 whence one branch conductor 84 leads to contract terminal 69ª (in switch unit V₂), another branch conductor 85 leading to contact terminal 70ᵇ (in switch unit V₂), and a third branch conductor 86 leading to a secondary branch point 87. From this secondary branch point 87 again a branch conductor 88 leads to contact terminal T₁' of the one limit switch T₁, while another branch conductor 89 leads to contact terminal T₂' of the other limit switch T₂. From terminal 47 of solenoid 45 (in switch V₁) an interconnecting conductor 90 leads to terminal 70ª (in switch unit V₂). From terminal 35 of solenoid 34 (in switch unit V₁) an interconnecting conductor 91 leads to terminal 69ᵇ (in switch unit V₂). From terminal 72ª (in switch unit V₂) a conductor 92 leads to contact terminal T₂'' of limit switch T₂. From contact terminal 71ª (in switch V₂) a conductor 93 leads to contact terminal T₁'' of limit switch T₁. Furthermore (in switch unit V₂) from contact terminal 71ᵇ an interlocking conductor 94 leads to terminal 66ᵇ of solenoid 66, and (also within switch unit V₂) from contact terminal 72ᵇ an interconnecting conductor 95 leads to terminal 68ᵇ of solenoid 68.

The various reversing relay switch units and limit switches (V₁, V₂, T₁, T₂) of this system are electrically so interconnected that when, for instance, limit switch T₁ has been actuated and closed as a result of carriage 11 having reached the near (end wall 10ᶜ) of the tank at the end of its full stroke travel, the electrical system is conditioned in accordance with the showing of the Figure 1 wiring diagram where in the relay switch unit V₂ the switch member 60 now has its contacts 69ª and 69ᵇ closed and contacts 70ª and 70ᵇ open, while switch member 61 now has its contacts 72ª and 72ᵇ closed and contacts 71ª and 71ᵇ open; whereas in relay switch unit V₁ and the switch member 29 being held by solenoid 34 then energized has all its contacts of the three power phases closed, while switch member 37, its solenoid 45 then being deenergized has all its contacts open. But when the carriage 11 upon reaching the far end wall 10ᵈ of the tank will have actuated the limit switch T₂, to be sent on its return trip to the near end of the tank, then the electrical system is conditioned in accordance with the showing of the Figure 2 wiring diagram where in the switch unit V₂ the switch member 61 now has its contacts 72ª and 72ᵇ open, and switch member 60 has its contacts 70ª and 70ᵇ closed and contacts 69ª and 69ᵇ open; whereas in the switch unit V₁ the switch member 37 being held by solenoid 45 then being energized, has all its contacts of the three phase power supply closed, while switch member 29, its solenoid 34 then being de-energized, has all its contacts open.

For the purpose of this invention, in order to establish the short stroke operation of the carriage in alternation with its long stroke cycle, there are provided means for short-circuiting the limit switch T₂ at will, namely at any intermediate point of the outward travel stroke of the carriage towards the far end of the tank. To this end there is indicated a push button switch 96 having conductor connections 97 and 98 at points 99 and 100 on conductors 92 and 86 respectively whereby limit switch T₂ can be bypassed at will, namely whenever the full stroke operation or cycle of the carriage is to be followed by one or more short travelling cycles, to the end of clearing away excess sludge from the bottom area surrounding the sludge outlet U.

In the plan view of the tank in the diagrammatic Figure 3, there are shown arrows S₁ indicating and designating the general longitudinal direction in which the sludge is moved by full-stroke operation of the mechanism from the end of the tank to be delivered at the collecting zone, whereas arrows S₂ and S₃ are shown to indicate and designate the general transverse direction in which the sludge is moved by short-stroke operation of the mechanism within the collecting zone into the sludge discharge outlet proper.

I claim:

The method of operating longitudinal settling tanks having influent means at one end, effluent means at the opposite end, a relatively flat bottom provided with relatively restricted sludge outlet means disposed intermediate the ends of the tank, and reciprocatory sludge raking means of the double-acting type adapted to travel back and forth full stroke between the ends of the tank, said double-acting raking means comprising opposed sets of inclined raking blade means, which sets of blade means are alternatively effective to convey sludge from respective ends of the tank in a substantially longitudinal direction towards said outlet means while also imparting a limited lateral component movement to the sludge; which method comprises alternating at least one full-stroke reciprocation of said raking means with at least one short-stroke reciprocation, the latter reciprocation being such as to cover a relatively limited short-stroke bottom area surrounding said outlet means proper to constitute a transverse sludge collecting zone, whereby said full stroke reciprocation conveys and delivers sludge from the ends of the tank to said short-stroke area, whereas the subsequent short-stroke reciprocation in effect provides transportation of the sludge within said short-stroke area in substantially transverse direction towards and into said restricted outlet means, so that potential sludge accumulation upon said short-stroke area is removable through said outlet means prior to the arrival at said short-stroke area of additional sludge conveyed by subsequent full stroke reciprocation of said raking means.

References Cited in the file of this patent

UNITED STATES PATENTS

| | | |
|---|---|---|
| 839,396 | Kremer | Dec. 25, 1906 |
| 862,192 | Paris | Aug. 6, 1907 |
| 1,773,479 | Escher | Aug. 19, 1930 |
| 1,911,008 | Withington | May 23, 1933 |
| 2,099,654 | Lund | Nov. 16, 1937 |
| 2,295,391 | Durdin | Sept. 8, 1942 |
| 2,589,298 | Scott | Mar. 8, 1952 |
| 2,670,080 | Scott | Feb. 23, 1954 |